United States Patent [19]
Hurlburt et al.

[11] Patent Number: 5,865,019
[45] Date of Patent: Feb. 2, 1999

[54] PLASTIC DIVIDER ASSEMBLY WITH FRAME FOR A CORN HEAD

[75] Inventors: Dale M. Hurlburt, Landisville; Gary L. Bich; James F. Rayfield, both of New Holland, all of Pa.

[73] Assignee: New Holland North America, Inc., New Holland, Pa.

[21] Appl. No.: 768,762

[22] Filed: Dec. 17, 1996

[51] Int. Cl.[6] .................................................. A01D 45/02
[52] U.S. Cl. ..................................... 56/119; 56/66; 56/98; 56/118
[58] Field of Search .................................. 56/59, 66, 69, 56/75, 78, 82, 88, 93, 98, 111, 118, 106, 108, 119, 94

[56] References Cited

U.S. PATENT DOCUMENTS

| | | | |
|---|---|---|---|
| 4,333,304 | 6/1982 | Greiner et al. | 56/98 X |
| 4,403,467 | 9/1983 | Baugh | 56/119 |
| 4,446,682 | 5/1984 | Jennen et al. | 56/119 |
| 4,493,181 | 1/1985 | Glendenning et al. | 56/119 X |
| 4,553,379 | 11/1985 | Kalverkamp | 56/106 X |
| 5,195,309 | 3/1993 | Mossman | 56/119 |

*Primary Examiner*—Terry Lee Melius
*Assistant Examiner*—Heather Shackelford
*Attorney, Agent, or Firm*—Larry W. Miller; J. William Stader; Frank A. Seemar

[57] ABSTRACT

The disclosure relates to a plastic row divider assembly with a frame for a corn head on a combine. The invention consists of several center divider assemblies surrounded by a pair of end divider assemblies. A center divider assembly consists of a narrow island shield supported by a narrow island shield sub-assembly. Pivotially attached to the narrow island shield sub-assembly is a narrow point shield sub-assembly. The narrow island shield sub-assembly is pivotially attached to the row unit frame. Affixed to the narrow point shield sub-assembly is a narrow point shield. An end divider assembly consists of an end island shield supported by an end island shield support sub-assembly. The end island shield support sub-assembly is pivotially affixed to the end frame. An end point shield is supported by an end island shield sub assembly. The sub-assembly is pivotially affixed to the row unit. The end point shield and narrow point shield heights may be altered. The dividers are designed to allow an unobstructed view of the row unit processing equipment when lifted.

12 Claims, 12 Drawing Sheets

PLASTIC DIVIDER ASSEMBLY WITH FRAME FOR A CORN HEAD

BACKGROUND OF INVENTION

1. Field of Art

This invention relates to the improvement of machines used in the harvesting of corn. More particularly, it relates to a crop row divider assembly on a corn head.

2. Description of Prior Art

Mechanical harvesting of corn has taken place for decades. However, efforts continue to make corn harvest operations more efficient and effective. A corn harvester generally includes a corn head which removes the ears from the stalks. The ear of corn is then fed into a separator or thresher which separates the grains of corn from all other materials. A corn head actually consists of several row assemblies, one for each row which is being harvested in a single pass over the field. In order to ensure a smooth flow of corn and to protect the equipment under the corn head assembly there are several conically shaped dividers affixed to the corn head. Each divider passes between two rows of corn. Typically each divider covers a pair of stalkrolls, stripper plates, gathering chains and gear boxes. Besides protecting this processing equipment, a well-designed row divider will ensure a smooth flow of corn crop into the corn head. A good divider will also prevent corn loss. As the corn head moves forward, the corn plants in each row enter the channel for processing by the corn head and thresher.

Currently, there are several drawbacks to existing row dividers used on existing corn heads. First, friction between the corn and row divider can either slow the speed of the corn entering the corn head or damage the corn. This requires that the farmer operate the combine or harvester at slower speeds. Second, most row dividers are of a complex design. This complexity increases their weight and maintenance costs. Third, most dividers are difficult to raise or lower. Raising the dividers allow for the easy maintenance of the processing equipment or the easy transport the corn head. Because of the their length, most dividers need to be folded in order to allow the corn head to be effectively transported from field to field. Fourth, in the prior art, when the dividers are raised, the processing equipment beneath the divider is partially obstructed. This makes maintenance more difficult to accomplish. Fifth, metal dividers rust or bend, effecting the flow of crop into the corn head. Sixth, the color on a metal divider can chip off making it difficult for the operator to correctly position the row divider between the rows of corn. Finally, in colder weather moisture will freeze to a metal divider and cause parts of the cornstalk to adhere to the divider.

The prior art illustrates these and additional difficulties. U.S. Pat. No. 4,446,682 discloses an agricultural attachment for harvesting agricultural products arranged in rows. This corn head uses a metal row divider which is capable of being tipped to allow for easier maintenance and transport. The divider hood is raised and the divider tip is pointed towards the ground. It is only possible to gain partial access to a single set of processing equipment. The access dilemma is quite noticeable when an entire row of dividers are raised. In that situation it is very difficult to gain access to the processing equipment located beneath the divider. The metal divider also results in a heavier, more complex corn head.

U.S. Pat. No. 4,403,467 discloses a row divider with a flexible plastic sheath. The divider consists of two sub-frames covered by a flexible plastic sheath. The sub-frames may be expanded or contracted depending on the size of the gap between corn rows. The frames are designed to stretch or contract the plastic sheath. As a result, the frames are complex and add weight and maintenance complexity to the row dividers. Additionally, no provision has been made for the transport of the corn head or if maintenance is needed on the processing equipment located beneath the divider.

U.S. Pat. No. 5,195,309 ('309) discloses a plastic crop divider for a row crop header. The '309 divider consists of a semiconical portion and a semicylindrical portion. Each portion consists of a double walled plastic shield and is hinged to the corn head frame. This divider has several drawbacks. The greatest drawback is the lack of any frame within the shields. The double walled structure is subject to bending moments when it is being pushed through the corn field. This bending moment is especially acute in the end dividers and semiconical portions. The disclosure attempts to overcome this deficiency by injecting foam into region between the double walls of the shield (col. 5, 16–30). Because of the double wall construction, the semiconical shield lacks support at the base. To overcome this problem, the base is heavily reinforced. This increases the weight of the entire shield. This creates further design drawbacks. First, the semiconical portion can be lifted, but cannot be moved entirely out of the way. This results in the divider always covering or partially covering the processing equipment making maintenance more complicated. Second, both the semicylindrical and heavy semiconical portions must be lifted so as to prepare for maintenance or transport.

Consequently, the need exists for a light-weight, durable crop row divider which is also easy to move for maintenance or transport.

OBJECTS OF THE INVENTION

It is an object of the present invention to provide a more durable row divider assembly.

It is a further object of the present invention to provide a row divider assembly which has a shield composed of a single walled plastic.

It is a further object of the present invention to provide a row divider assembly which is easier to gain access to the processing equipment on a corn head.

It is a further object of the present invention to provide a row divider assembly which has a smooth and relatively frictionless shield for effective crop flow.

It is a further object of the present invention to provide a row divider which has shields that are easy to lift.

It is a further object of the present invention to provide a row divider which has shield that when lifted does not obstruct the processing equipment in a corn head.

It is a further object of the present invention to provide a row divider which has fewer parts than prior art dividers thus simplifying maintenance.

It is a further object of the present invention to provide a row divider which is lighter in weight.

It is a further object of the present invention to provide a row divider assembly which is easy to prepare for transport.

It is a further object of the present invention to provide a row divider assembly which will retain its shape despite a large bending moment on the point shields.

It is a further object of the present invention to provide a row divider assembly which will not rust.

It is a further object of the present invention to provide a row divider assembly from which paint will not chip.

SUMMARY OF THE INVENTION

The invention overcomes the deficiencies of the prior art. The invention provides a plastic divider assembly with frame for a corn head. The invention consists of several center divider assemblies and two end divider assemblies.

A center divider assembly consists of a narrow island shield sub-assembly pivotially affixed to the row unit frame. Attached to the narrow island shield sub-assembly is the narrow island shield. Pivotially affixed to the narrow island shield sub-assembly is the narrow point shield sub-assembly. The narrow point shield sub-assembly supports the narrow point shield. The height of the narrow point shield can be adjusted by a center height assembly which is also attached to the row unit frame. The entire assembly can be rotated over row unit frame and corn head to allow an unobstructed view of the processing equipment in a row unit.

An end divider assembly consists of an end island shield sub-assembly pivotially affixed to the end frame. Attached to the end island shield sub-assembly is the end island shield. Pivotially affixed to row frame unit is the end point shield sub-assembly. The end point shield sub-assembly supports the end point shield. The height of the end point shield can be adjusted by an end height assembly which is also attached to the row unit frame. The end point shield can prop open the end island shield sub-assembly for transport or maintenance.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface.

Figure 1:
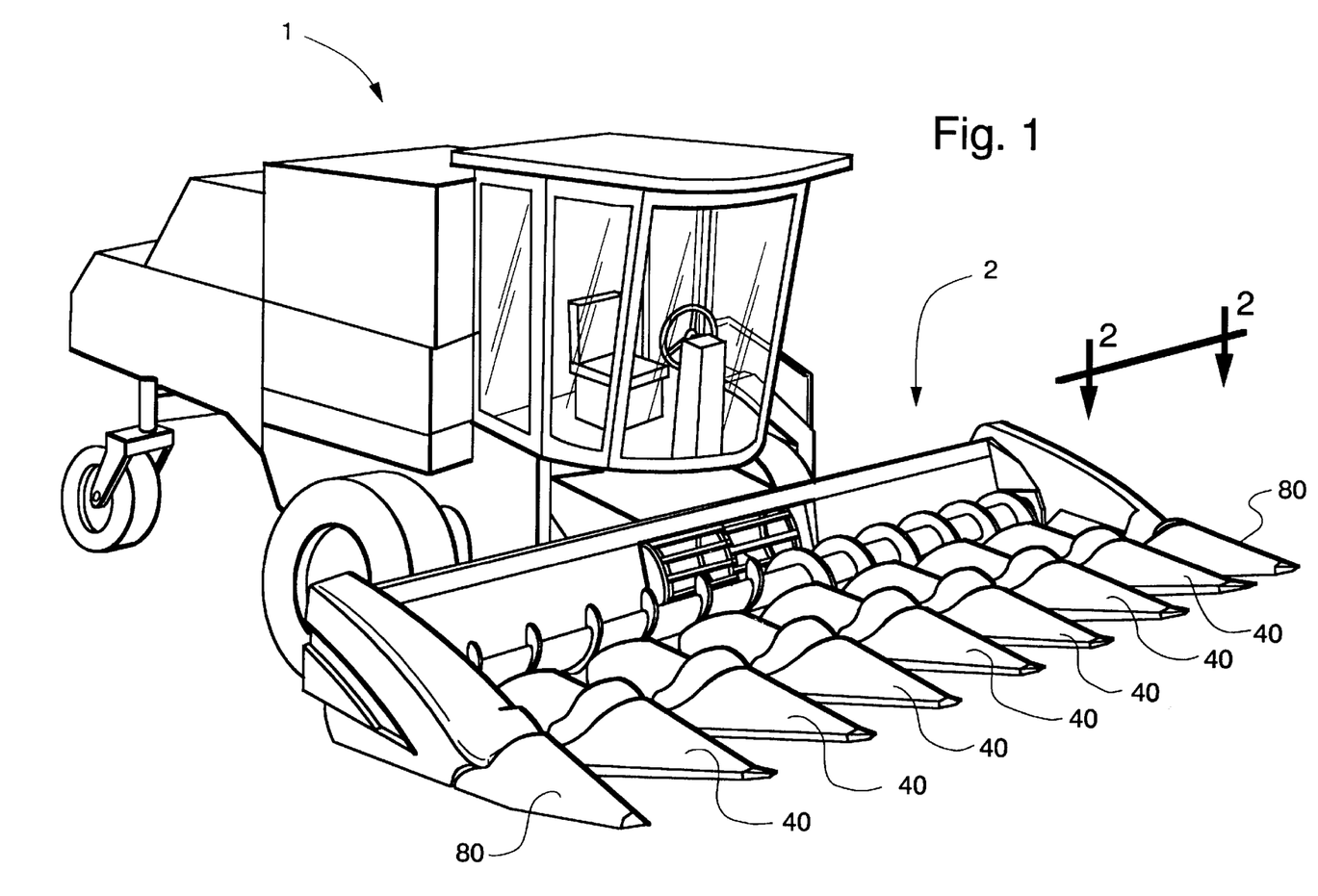
FIG. 1 is a general view of a corn harvester combine with a corn head containing the present invention.

The invention is located on the corn head 2 of a corn harvester or combine 1. FIG. 1 illustrates a conventional combine. Typically, there is a corn head 2 attached by the feeder house or elevator to a combine 1. The row dividers move between rows of corn and the corn stalks are drawn rearward by a front auger and then cut by the stalkroll. The gathering chains feed the ear of corn backwards to a transverse auger. This auger moves the corn into the feeder house. The ears of corn are moved through the feeder house into a threshing system located in the combine 1. The corn kernels are then separated from the ear. The kernels of corn are then moved and stored in a grain tank located at the top of the combine. These are discharged later. The chaff or trash is discharged from the rear of the combine 1. An operator drives the combine from a glass cab with a chair and steering column. From the cab, the operator can observe most of the corn head 2 and combine 1 functions.

Figure 2:
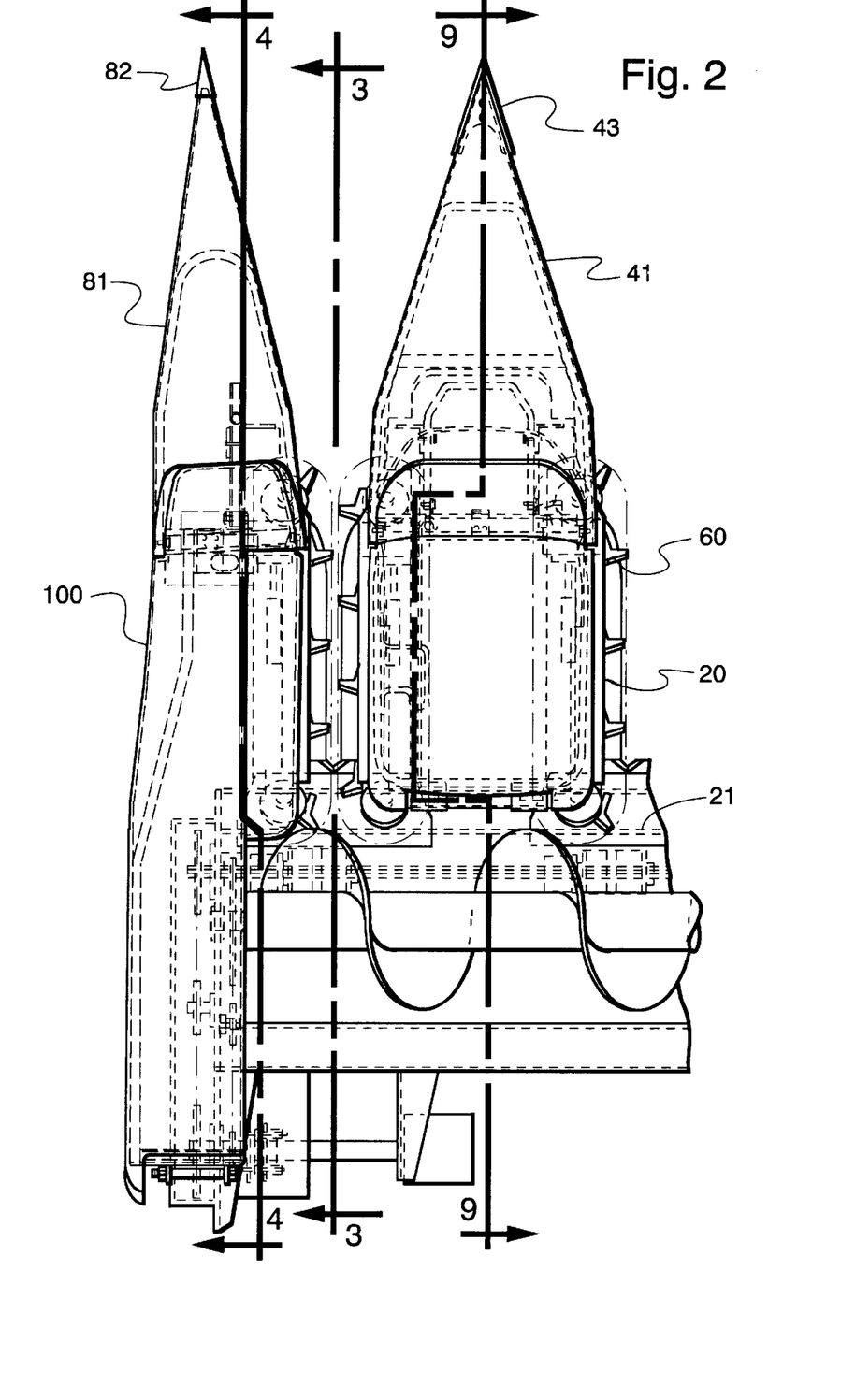
FIG. 2 is an enlarged overhead view taken along line 2—2 of FIG. 1 showing the left side end divider assembly and a center divider assembly.

The present invention is located on the front of the corn head 2 The corn head 2 has a row beam 21. Affixed to the row beam 21 are several row unit frames 20. Attached at opposite ends of the row beam 21 is the end frame 30. Each row unit frame typically supports the stalkrolls, stripper plates, gathering chains and gear boxes (hereafter referred to as corn head processing equipment). The end frame typically supports the transverse auger and auger drive system. The plastic divider assembly with frame 10 typically consists of two end divider assemblies 80 located at opposite ends of the corn head 2. Between the end divider assemblies 80 are several center divider assemblies 40. Each end divider assembly 80 consists of an end point shield 81 supported by an end point shield sub-assembly 83. Behind the end point shield 81 is the end island shield 100. It is supported by the end island shield sub-assembly 102. Controlling the height of the end point shield is an end height assembly 131. Each center divider 40 consists of a narrow point shield 41 supported by a narrow point shield sub-assembly 44. Behind the narrow point shield 41 is the narrow island shield 60. The narrow island shield 60 is supported by the narrow island shield sub-assembly 61. Controlling the height of the narrow point shield 60 is the center height assembly 120. The center divider assembly 40 can be rotated over the corn head revealing the row unit frame 20 below.

Figure 3:
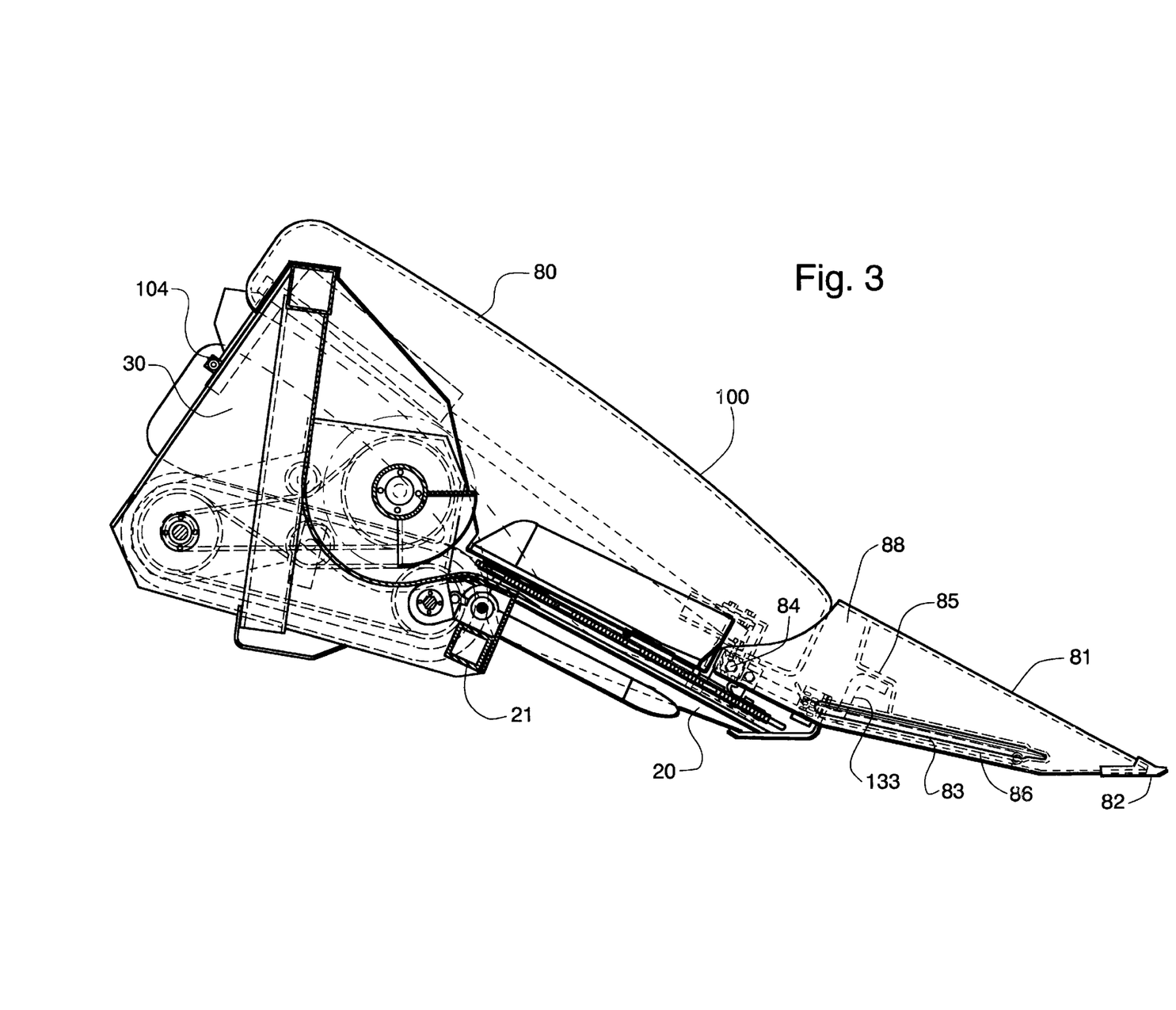
FIG. 3 is an enlarged sectional view taken along line 3—3 of FIG. 2 showing the end divider assembly.

The end divider assembly 80 consists five major elements—the end point shield 81, the end point shield sub-assembly 83, the end island shield 100, the end island shield sub-assembly 102 and an end height assembly 131.

The end point shield 81 is a semiconical shield located at the front of the end divider assembly 80. The shield is a rotationally molded plastic that is single walled. The shield has an end point 82 which can be reinforced with a metal tip. There is an end point channel 86 molded into the shield for receiving the end point shield sub-assembly 83. The end point base 88 has an end point support rest 85 molded into the shield.

Figure 8:
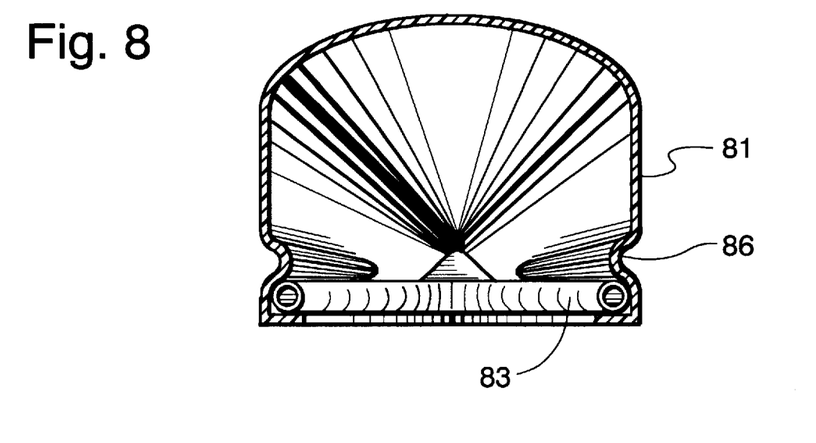
FIG. 8 is an enlarged sectional view taken along line 8—8 of FIG. 5 showing the end point shield and end point shield sub-assembly.

The end point shield sub-assembly 83 consists of a triangularly shaped frame with a pair of hinges 84. The sub-assembly 83 is attached to the row unit frame 20. The end point shield sub-assembly 83 is capable of pivoting relative to row unit. If desired, additional reinforcements to the end point shield 81 maybe added to the sub-assembly to allow for operating in a harsh environment.

The end island shield 100 is located behind the end point shield 81. The end island shield 100 has a matching right side shield. Both shields are identical, mirror images containing the same elements. The end island shield 100 is rotationally molded and single walled. It has a forward portion 108 and rear portion 109. An ear saver to prevent corn from falling into the end point base 88 is affixed to the end island shield 100.

Figure 7:
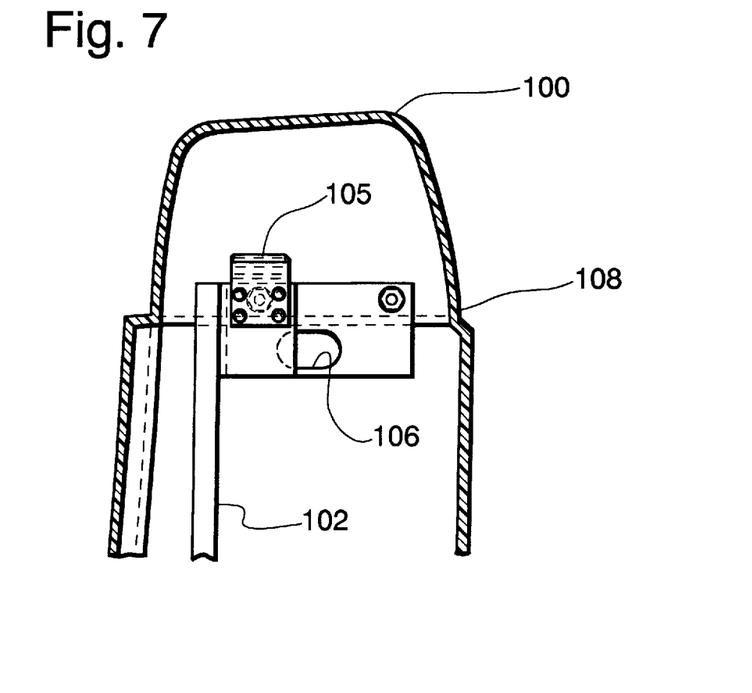
FIG. 7 is an enlarged sectional view taken along line 7—7 of FIG. 5 showing the end point receptacle.

The end island shield sub-assembly 102 is a single bar that supports the end island shield 100. Like the end island shield, 100, the end island shield sub-assembly 102 has a matching right side sub-assembly. Both sub-assemblies are identical, mirror images containing the same elements. The end island shield sub-assembly 102 has an end frame hinge 104, an end latch 105 and end point receptacle 106. The end frame hinge is connected and pivots about the end frame 30 of the corn head 2. The end latch 105 latches onto the end height assembly 131. The end latch 105 holds the sub-assembly 102 and shield 100 down during harvesting operations. The end point receptacle 106 is located at the end of the sub-assembly 102 furthest from the end frame hinge 104. The end point receptacle 106 can receive the end point 82 during maintenance or transport of the corn head 2.

Figure 4:
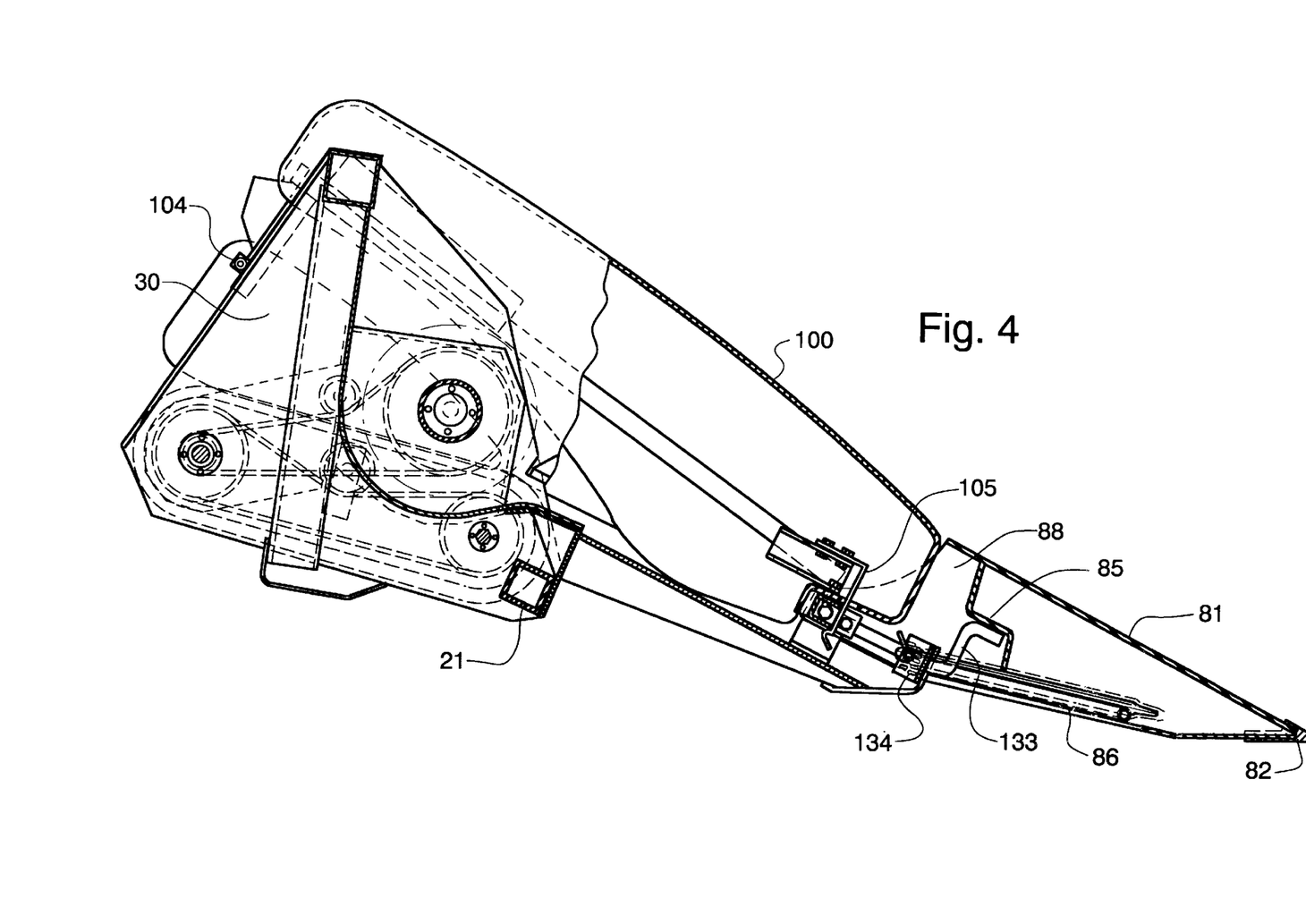
FIG. 4 is an enlarged sectional view taken along line 4—4 of FIG. 2 showing the end divider assembly with particular emphasis on the end height assembly.
Figure 6:
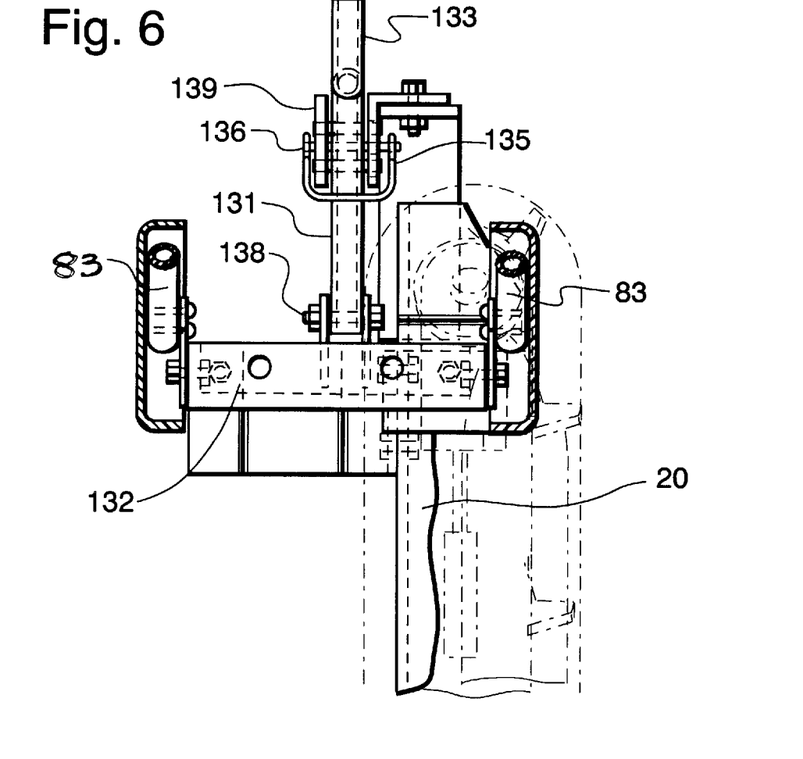
FIG. 6 is an enlarged sectional view taken along line 6—6 of FIG. 5 showing end height assembly.

The end height assembly 131 controls the height of the end point 82. The end height assembly can raise or lower the end point 82 relative to the ground. The end height assembly 131 consists of end bracket sub-assembly 132. Attached to the end bracket sub-assembly 132 is the end height bar pivot pin 138. The end height bar 133 is attached at one end to the pivot pin 138. This allows the end height bar 133 to pivot. The end bracket sub-assembly 132 is affixed to a row unit frame 20. The left end height bracket 134 (mirror image right end height bracket is item 135) is also affixed to the row unit frame 20, but forward of the end bracket sub-assembly 132. Each end height bracket 134 and 135 has several position holes 137. A retaining pin 136 is inserted into a positioning hole 137 on the left end height bracket 134. The retaining pin then passes into an aperture in the end height bar 133 and into right end height bracket 135. The height of the height bar 133 can be raised or lowered by selecting the desired positioning holes. The end point support rest 85 is supported by the end height bar 133. Consequently, by altering the positioning hole 137 the end height bar 133 is raised or lowered which changes the height of the end point 82.

Figure 5:
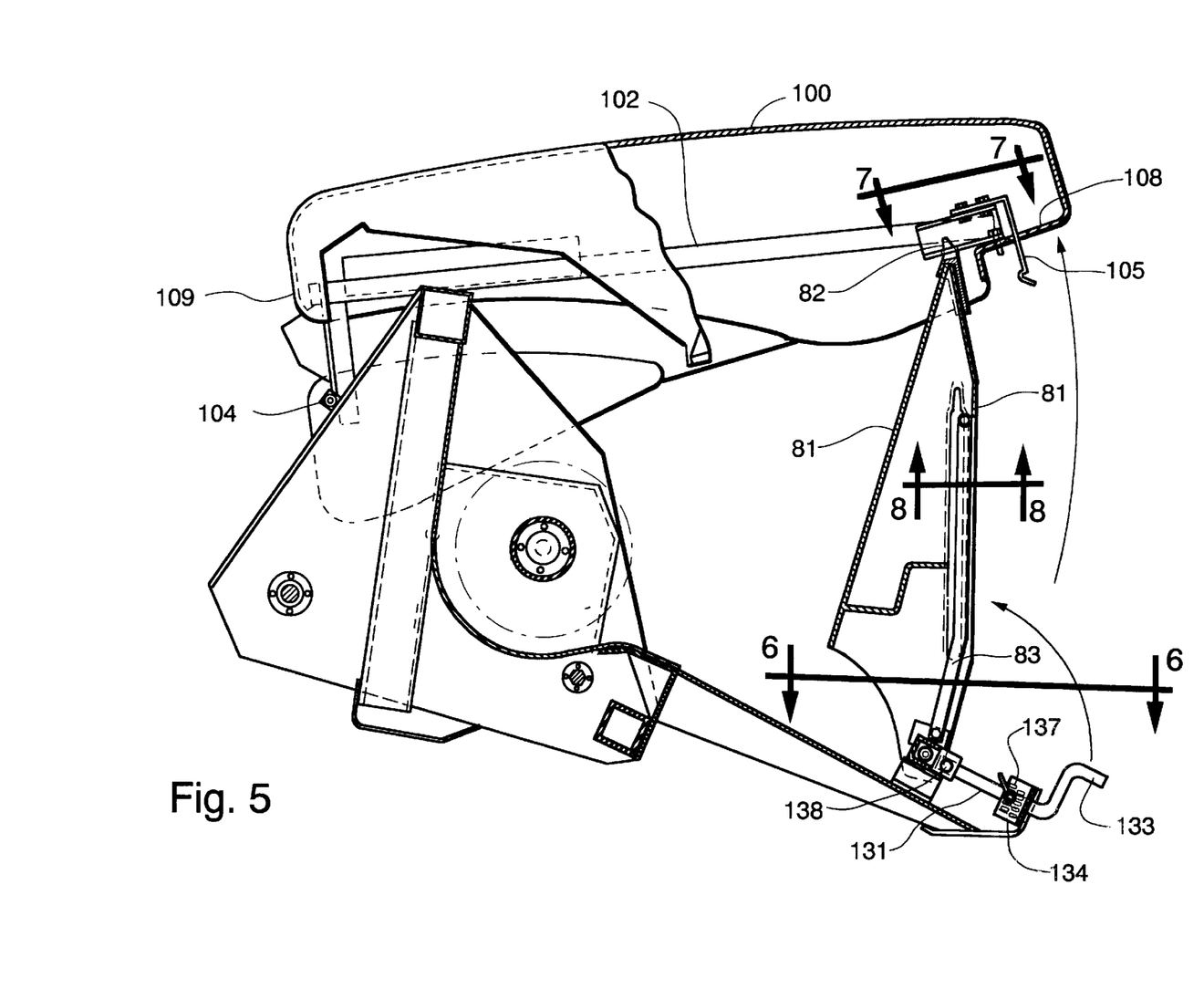
FIG. 5 is an enlarged sectional view showing the end point shield raised and the end island shield raised.

During routine harvesting operations, the end point shield 81 and end island shield 100 and corresponding shield support sub-assemblies are lowered. The end latch 105 secures the end island shield 100 and end island shield sub-assembly 102 to the end bracket sub-assembly 132. The height of the end point 82 is determined by the end height bar 133 supporting the end point support rest 85. For maintenance or to transport the corn head 2, the end point shield 81 and end island shield 100 can be raised as illustrated in FIG. 5. To accomplish this, the end latch 105 is released and the end island shield 100 and end island shield sub-assembly 102 are raised and pivoted about the end frame hinge 104. The end point 82 and end point shield sub-assembly 83 are then raised and pivoted about the hinge 84. The end point 82 is then inserted into the end point receptacle 106 in the end island shield sub-assembly 102.

Figure 9:
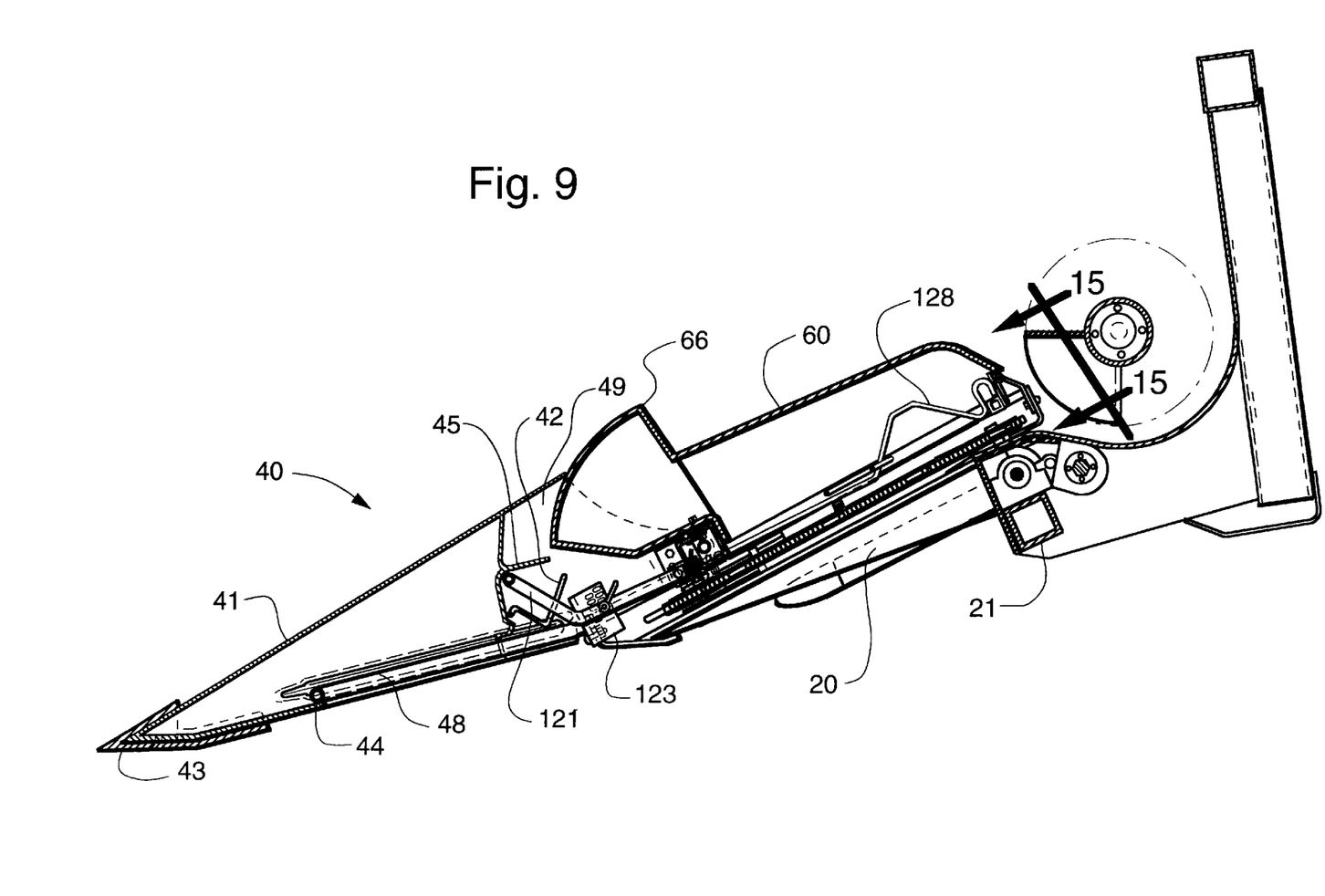
FIG. 9 is an enlarged sectional view taken along line 9—9 of FIG. 2 showing the center divider assembly.

The center divider assembly 40 consists of five major elements—the narrow point shield 41, the narrow point shield sub-assembly 44, the narrow island shield 60, the narrow island shield sub-assembly 61 and the center height assembly 120.

The narrow point shield 41 is a semiconical shield located at the front of the center divider assembly 40. The shield is rotationally molded and is single walled. The shield has a narrow point 43 which can be reinforced with a metal tip. There is a narrow point shield channel 48 molded into the shield for receiving the narrow point shield sub-assembly 44. The narrow point base 49 has a center support rest 45 molded into the shield. The center support rest 45 receives the center height bar 121. Also attached to the narrow point base 49 is the narrow point prop 42. The prop is 'C' shaped and can rotate. The prop 42 supports the narrow point shield 41 so as to orient the narrow point 43 in an upward position for maintenance or transport.

Figure 13:
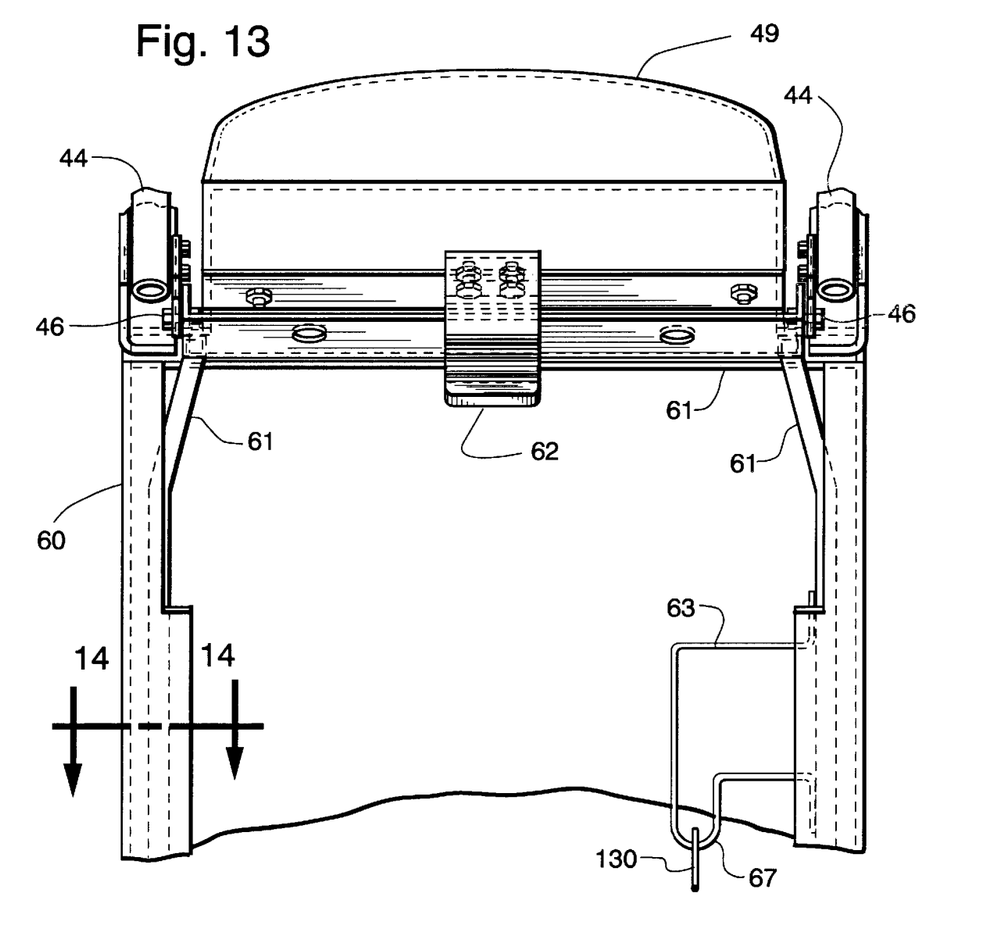
FIG. 13 is an enlarged sectional view taken along line 13—13 of FIG. 11 showing the narrow point hinge and center latch.

The narrow point shield sub-assembly 44 consists of a triangularly shaped frame with a pair of hinges 46. The sub-assembly 44 is hinged to the narrow island shield sub-assembly 61. The narrow point shield sub-assembly 44 is capable of pivoting relative to narrow island shield sub-assembly 61. If desired, additional reinforcement to the narrow point shield 41 maybe added to the sub-assembly 44 to allow for operating in a harsh environment.

The narrow island shield 60 is located behind the narrow point shield 41. The narrow island shield 60 is rotationally molded plastic that is single walled. It has an elongated section 66. The elongated section 66 nests partially inside the narrow point base 49. The narrow point prop 42 catches on the edge of the elongated section 66 to hold the narrow point shield 41 and sub-assembly 44 in an upward position during maintenance or transport. A pair of ear savers can be affixed behind the elongated section 66 prevent corn from falling into the narrow point base 49.

Figure 14:
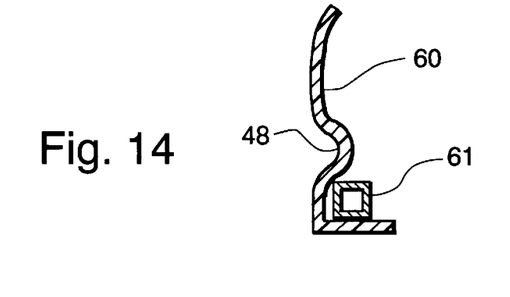
FIG. 14 is an enlarged sectional view taken along line 14—14 of FIG. 13 showing the narrow island shield and narrow island shield sub-assembly.
Figure 15:
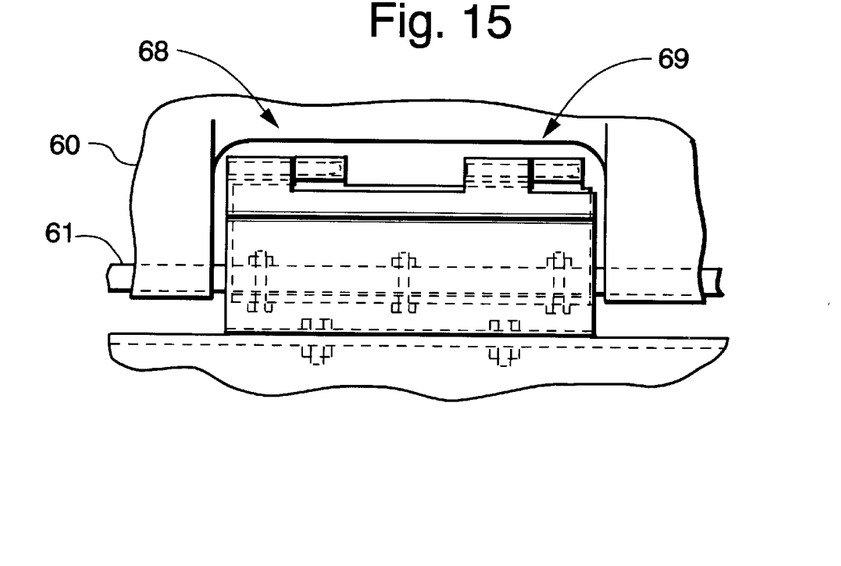
FIG. 15 is an enlarged sectional view taken along line 15—15 of FIG. 9 showing the narrow island hinge pins.
Figure 16:
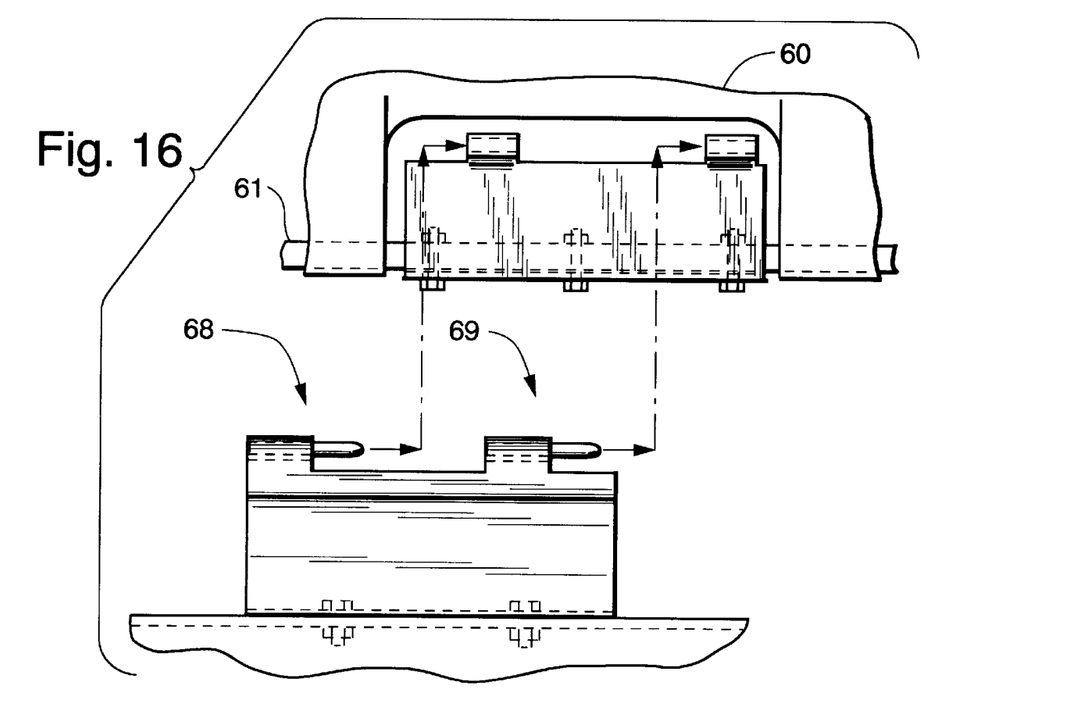
FIG. 16 is an enlarged view showing the narrow island shield sub-assembly removed from the narrow island hinge pins.

The narrow island shield sub-assembly 61 is rectangular shaped. The narrow island shield sub-assembly 61 supports the narrow island shield 60. Affixed to the sub-assembly 61 is the prop support 63. The prop support 63 is approximately rectangular and has a prop catch 67. Also affixed to the sub-assembly 61 is the center latch 62. Finally, the narrow island hinge sub-assembly 64 is affixed to the narrow island shield sub-assembly 61. The hinge sub-assembly 64 has a left and right narrow island hinge pins 68 and 69 (as illustrated in FIG. 15). The hinge sub-assembly 64 is connected and pivots about the row unit frame 20 and the corn head. The left and right hinge pins 68 and 69 are oriented in the same directions. This allows the narrow point shield 41, narrow point shield sub-assembly 44, narrow island shield 60 and narrow island shield sub-assembly 61 to be removed by sliding the hinge sub-assembly 64 off the hinge pins 68 and 69 (as illustrated in FIG. 16).

Figure 12:
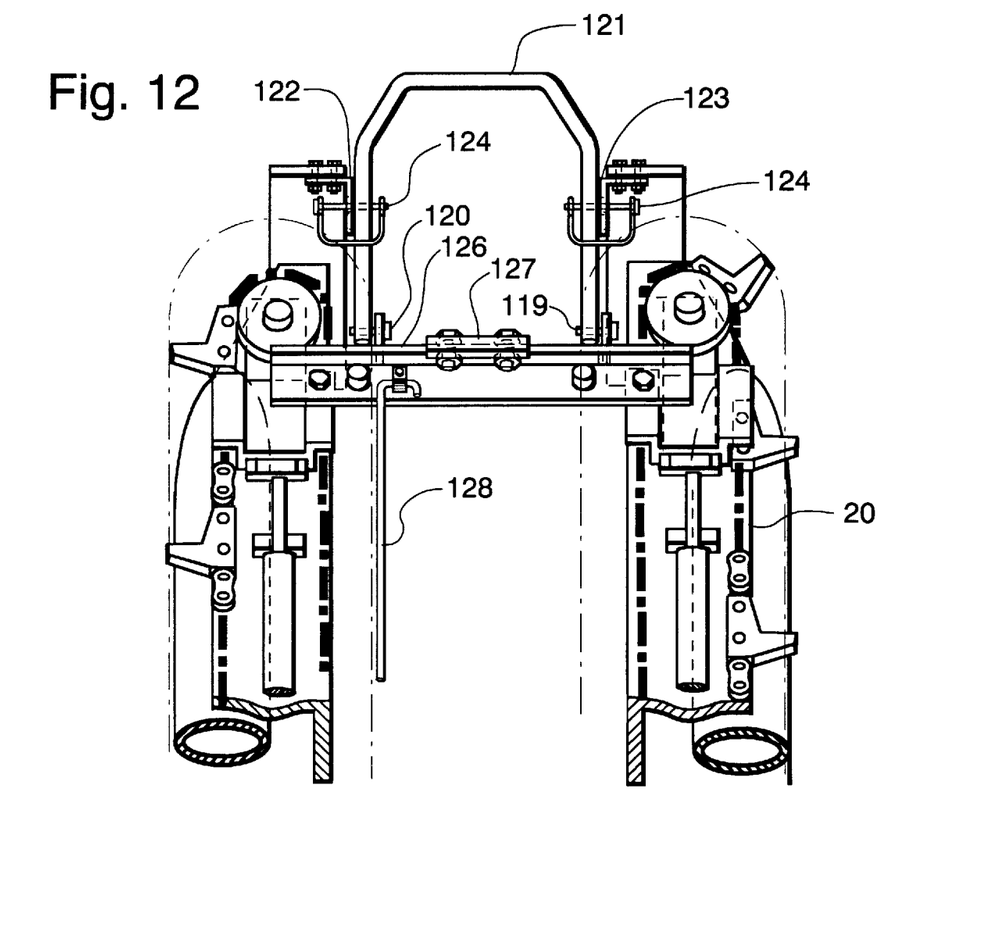
FIG. 12 is an enlarged sectional view taken along line 12—12 of FIG. 11 showing the center height assembly.

The center height assembly 120 controls the height of the narrow point 43. The center height assembly 120 can raise or lower the narrow point 43 relative to the ground (as indicated by the phantom lines in FIG. 10). The center height assembly 120 consists of a height bar support assembly 126, a center latch catch 127, a center prop 128, a pair of center height bar pivot pins 118 and 119, a center height bar 121, a pair of center height brackets 122 and 123 and a pair of retaining pins 124. The latch catch 127 is located near the center of the height bar support assembly 126. The latch catch 127 is for receiving the center latch 62 of the narrow island shield sub-assembly 61. Pivotially affixed near the latch catch 127 is the center prop 128. The center prop 128 also has a bend 129 and a prop catch 130. Typically, the center prop 128 is inserted through the prop support 63 of the narrow island shield sub-assembly 61. The prop catch 130 is inserted into the prop support catch 67 and supports the narrow point shield 41, narrow point shield sub-assembly 44, narrow island shield 60 and narrow point shield sub-assembly 61 during maintenance. The bend 129 assists in the storage of the center prop 128 when the shields and frames are lowered. Each end of the center height bar 121 is attached to a pivot pin 118 or 119. This allows the center height bar 121 to pivot. The left end height bracket 122 (mirror image right center height bracket is item 123) is affixed to the row unit frame 20, but forward of the center height bar support assembly 126. Each center height bracket 122 and 123 has several position holes 125. A retaining pin 124 is inserted into a positioning hole 125 on the left center height bracket 122. The retaining pin then passes into an aperture in the center height bar 121. Another retaining pin 124 is inserted into the right center height bracket 123. The height of the height bar 121 can be raised or lowered by selecting the desired positioning holes. The center support rest 45 is supported by the center height bar 121. Consequently, by altering the positioning hole 125 the center height bar 121 is raised or lowered which changes the height of the narrow point 43.

Figure 10:
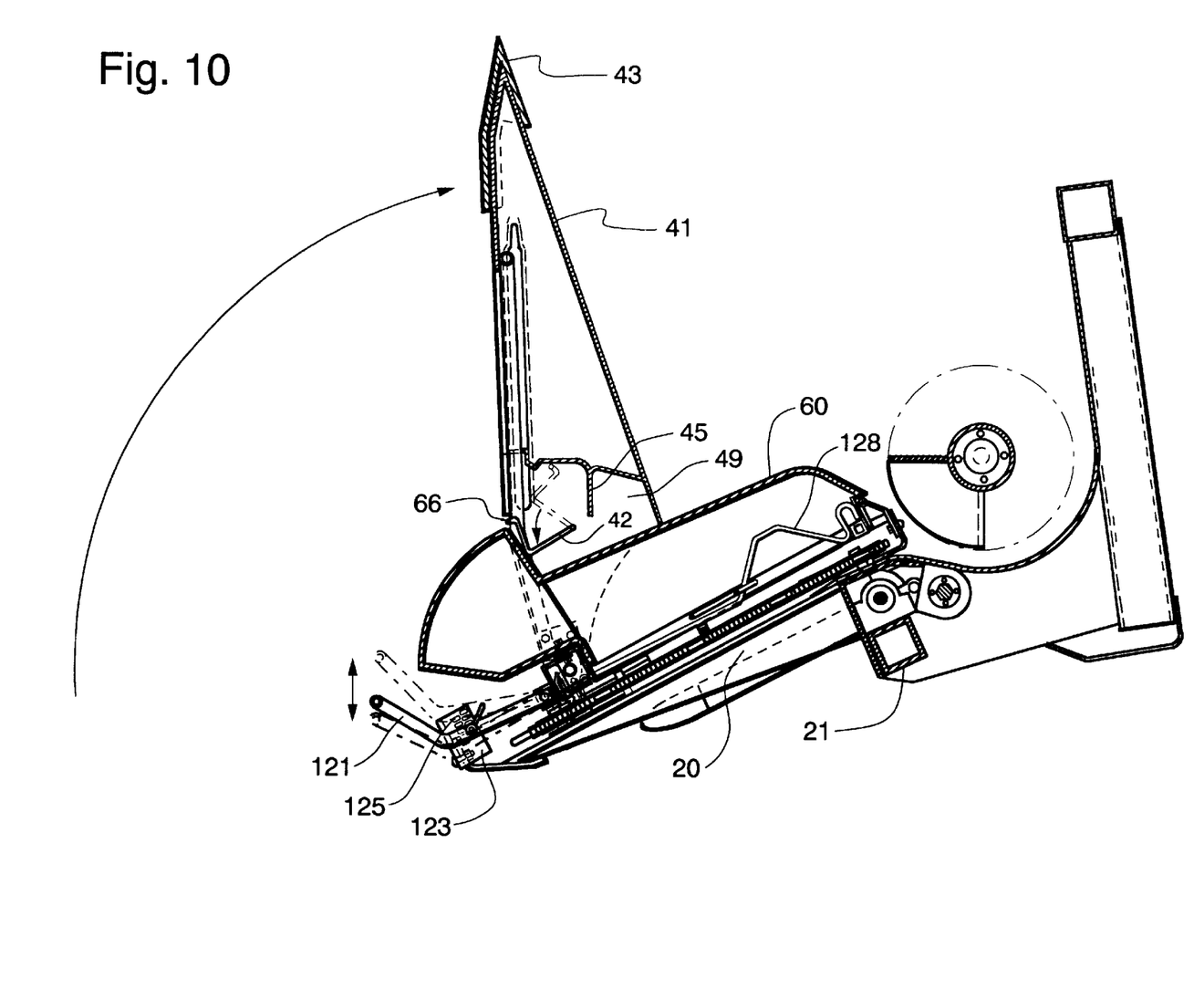
FIG. 10 is an enlarged sectional view showing the narrow point shield being raised.
Figure 11:
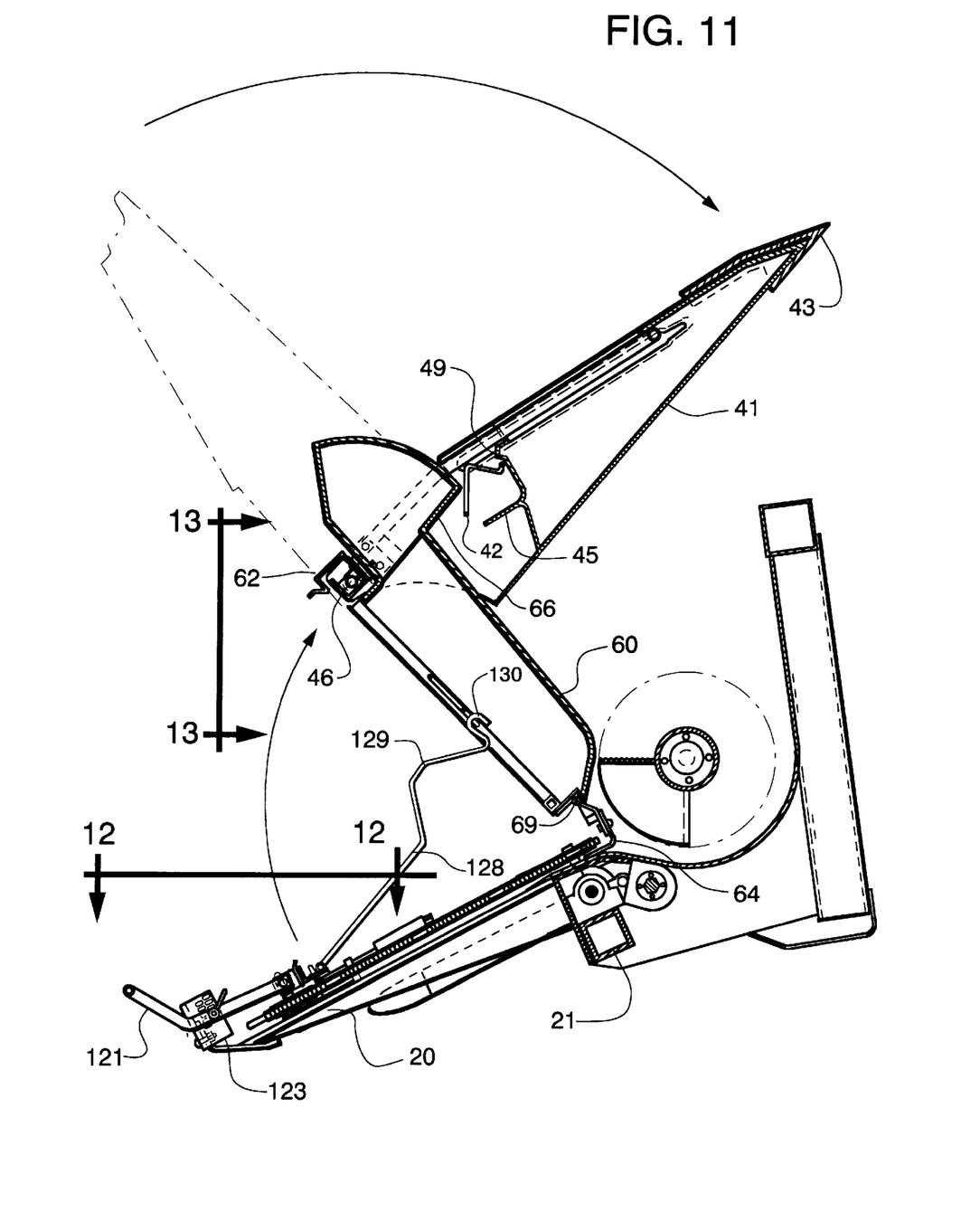
FIG. 11 is an enlarged sectional view showing the narrow island shield and narrow point shield being rotated over the row beam.

While the corn head 2 is being used in routine harvesting operations, the narrow point shield 41 and narrow island shield 60 and corresponding shield support sub-assemblies are lowered. The center latch 62 secures the narrow island shield 60 and narrow island shield sub-assembly 61 to the center latch catch 127 on the center height bar support assembly 126. The height of the narrow point 43 is determined by the center height bar 121 supported by the center support rest 45. For maintenance or transport of the corn head 2, the narrow point shield 41 and the narrow island shield 60 can be raised and rotated about the row beam 21. To accomplish this, the narrow point shield 41 and sub-assembly 44 are raised and the narrow point prop 42 is rotated so as to contact the elongated section 66 of the narrow island shield (as shown in FIG. 10). Next the center latch 62 is released and the narrow island shield 60 and sub-assembly 61 are raised. The prop catch 130 of the center prop 128 may then be inserted into the prop catch 67 (as illustrated in FIG. 11). This will provide an unobstructed view of the corn head processing equipment. Because the single walled plastic shields supported by the sub-assemblies, the divider assemblies are considerable lighter than a reinforced double walled plastic shield. This reduction in weight allows the narrow point shield sub-assembly 44 to be hinged to the narrow island shield support sub-assembly 61 and not to directly to the row unit frame 20. This allows both sub-assemblies 44 and 61 to be rotated completely over the row beam 21 exposing the processing equipment. The prior art dividers are too heavy to be rotated in such a manner. Further assisting the rotation of the narrow point shield 41 and sub-assembly 44 occurs because of the unique hinge design 46 between the narrow point shield sub-assembly 44 and the narrow island shield sub-assembly 61. When the narrow point shield 41 and sub-assembly 44 are raised and propped, the center of gravity of the center divider assembly shifts over the narrow island shield 60 and sub-assembly 61. The narrow island shield 60 and sub-assembly 61 (and propped narrow point shield 41 and sub-assembly 44) are easier than prior art dividers to rotate because the center of gravity of the entire divider assembly is located close to the row beam 21. Rotation around the narrow island hinge sub-assembly 64 relative to the row beam takes considerable less force than if the center of gravity were located further from the row beam 21.

It will be obvious to those skilled in the art that various changes may be made without departing from the scope of the invention and the invention is not to be considered limited to what is illustrated in the drawings and described in the specification.

What is claimed is:

1. A divider assembly for a corn head on a corn harvester, comprising:
   a. a row beam having a row unit and an end frame;
   b. a center divider assembly with a center height assembly affixed to the row unit, said center divider assembly comprising:
      i. a single walled plastic narrow island shield supported by a narrow island shield sub-assembly, said narrow island shield sub-assembly pivotially connected to the row unit;
      ii. a single walled plastic narrow point shield supported by a narrow point shield sub-assembly, said narrow point shield sub-assembly pivotially connected to the narrow island shield sub-assembly, said narrow point shield further comprising a narrow point shield channel molded into the narrow point shield for receiving the narrow point shield sub-assembly, said narrow point shield further having a narrow point shield base with a narrow point shield base having a narrow point prop and a center support rest for receiving a center height bar, said narrow point prop for supporting the narrow point shield whereby the narrow island shield and the narrow point shield may be rotated over the row beam;
   c. an end divider assembly with an end height assembly affixed to the row unit, said end divider assembly comprising:
      i. a single walled plastic end island shield supported by an end island shield sub-assembly, said end island shield sub-assembly pivotially connected to the end frame; and
      ii. a single walled plastic end point shield supported by an end point shield sub-assembly, said end point shield sub-assembly pivotially connected to the row unit.

2. The divider assembly as defined in claim 1, wherein affixed to the narrow island shield sub-assembly is a latch, a prop support, and a narrow island hinge sub-assembly, said prop support having a prop support catch.

3. The divider assembly as defined in claim 2, wherein the center height assembly further comprises a height bar support assembly with a latch catch, a prop, a center height bar rotationally pivoting about a center height bar pivot pin, said center height bar adjusted by a center height bracket, whereby a narrow point can be adjusted.

4. The divider assembly as defined in claim 3, wherein the center height bracket has a plurality of positioning holes, therein and a retaining pin for insertion into a positioning hole.

5. The divider assembly as defined in claim 4, wherein the end point shield further comprises an end point shield channel, said end point shield channel receives the end point shield sub-assembly.

6. The divider assembly as defined in claim 5, wherein the end point shield further comprises an endpoint shield base having an end point support rest for receiving an end height bar.

7. The divider assembly as defined in claim 6, wherein the end island shield sub-assembly further comprises a main frame hinge, an end latch and an end point receptacle for receiving an end point, whereby the end point shield is rotated and the end point is inserted into the end point receptacle.

8. The divider assembly as defined in claim 7, wherein the end height assembly further comprises an end bracket sub-assembly with an end height bar rotationally pivoting about an end height bar pivot pin, said end height bar adjusted by an end height bracket, whereby the end point can be adjusted.

9. The divider assembly as defined in claim 8, wherein the end height bracket has a plurality of positioning holes therein and a retaining pin for insertion into a positioning hole, whereby the end height bar is adjusted.

10. The divider assembly as defined is claim 9, wherein the end point shield sub-assembly is triangularly shaped.

11. The divider assembly as defined in claim 10, wherein the narrow point shield sub-assembly is triangularly shaped.

12. The divider assembly as defined in claim 11, where in the narrow island shield sub-assembly is rectangularly shaped.

\* \* \* \* \*